US008878041B2

(12) United States Patent
Attias et al.

(10) Patent No.: US 8,878,041 B2
(45) Date of Patent: Nov. 4, 2014

(54) DETECTING BEAT INFORMATION USING A DIVERSE SET OF CORRELATIONS

(75) Inventors: Hagai T. Attias, San Francisco, CA (US); Darko Kirovski, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 944 days.

(21) Appl. No.: 12/472,777

(22) Filed: May 27, 2009
(Under 37 CFR 1.47)

(65) Prior Publication Data

US 2010/0300271 A1 Dec. 2, 2010

(51) Int. Cl.
*G04B 13/00* (2006.01)

(52) U.S. Cl.
CPC ........... *G01H 1/40* (2013.01); *G01H 2210/078* (2013.01); *G01H 2250/235* (2013.01); *G10H 2250/135* (2013.01)
USPC .................... 84/609; 84/603; 84/608; 84/649

(58) Field of Classification Search
CPC ............... G06K 9/00087; G06F 17/18; G10H 2210/076; G10H 1/40; G10H 2210/031; G10H 2210/071; G10H 2220/081; G10H 2210/341; G10H 2210/375; G01H 1/003; G01H 9/004; G10G 1/00; G10G 7/00
See application file for complete search history.

(56) References Cited

U.S. PATENT DOCUMENTS

| | | | |
|---|---|---|---|
| 4,020,285 | A | 4/1977 | Branscome et al. |
| 4,433,211 | A | 2/1984 | McCalmont et al. |
| 4,980,887 | A | 12/1990 | Dively et al. |
| 5,214,502 | A | 5/1993 | Stone et al. |
| 5,550,541 | A | 8/1996 | Todd |
| 5,646,997 | A | 7/1997 | Barton |
| 5,687,236 | A | 11/1997 | Moskowitz et al. |
| 5,745,604 | A | 4/1998 | Rhoads |
| 5,809,139 | A | 9/1998 | Girod et al. |

(Continued)

FOREIGN PATENT DOCUMENTS

| | | |
|---|---|---|
| EP | 0581317 | 2/1994 |
| EP | 0770498 | 5/1997 |

(Continued)

OTHER PUBLICATIONS

Wang, et al., "Dancing Motion Generation of a Virtual Human by Recognition of Music Beat Information," retrieved at <<http://168.188.129.240/publications/Recognition_of_Music_Beat_information.doc>>, 3 pages.

(Continued)

*Primary Examiner* — Marlon Fletcher
(74) *Attorney, Agent, or Firm* — Sandy Swain; Judy Yee; Micky Minhas

(57) ABSTRACT

A beat analysis module is described for determining beat information associated with an audio item. The beat analysis module uses an Expectation-Maximization (EM) approach to determine an average beat period, where correlation is performed over diverse representations of the audio item. The beat analysis module can determine the beat information in a relative short period of time. As such, the beat analysis module can perform its analysis together with another application task (such as a game application task) without disrupting the real time performance of that application task. In one application, a user may select his or her own audio items to be used in conjunction with the application task.

18 Claims, 12 Drawing Sheets

(56) References Cited

U.S. PATENT DOCUMENTS

| | | | | |
|---|---|---|---|---|
| 5,822,360 | A | 10/1998 | Lee et al. | |
| 5,822,432 | A | 10/1998 | Moskowitz et al. | |
| 5,852,469 | A | 12/1998 | Nagai et al. | |
| 5,889,868 | A | 3/1999 | Moskowitz et al. | |
| 5,905,800 | A | 5/1999 | Moskowitz et al. | |
| 5,917,914 | A | 6/1999 | Shaw | |
| 5,930,369 | A | 7/1999 | Cox et al. | |
| 5,933,798 | A | 8/1999 | Linnartz | |
| 5,970,140 | A | 10/1999 | Sandford, II et al. | |
| 5,991,426 | A | 11/1999 | Cox et al. | |
| 6,024,287 | A | 2/2000 | Takai et al. | |
| 6,029,126 | A | 2/2000 | Malvar | |
| 6,031,914 | A | 2/2000 | Tewfik et al. | |
| 6,061,793 | A | 5/2000 | Tewfik et al. | |
| 6,064,738 | A | 5/2000 | Fridrich | |
| 6,064,764 | A | 5/2000 | Bhaskaran et al. | |
| 6,088,325 | A | 7/2000 | Giardina et al. | |
| 6,094,483 | A | 7/2000 | Fridrich | |
| 6,128,736 | A | 10/2000 | Miller | |
| 6,131,162 | A | 10/2000 | Yoshiura et al. | |
| 6,192,139 | B1 | 2/2001 | Tao | |
| 6,208,735 | B1 | 3/2001 | Cox et al. | |
| 6,208,745 | B1 | 3/2001 | Florencio et al. | |
| 6,209,094 | B1 | 3/2001 | Levine et al. | |
| 6,219,634 | B1 | 4/2001 | Levine | |
| 6,246,345 | B1 | 6/2001 | Davidson et al. | |
| 6,256,736 | B1 | 7/2001 | Coppersmith et al. | |
| 6,259,801 | B1 | 7/2001 | Wakasu | |
| 6,275,599 | B1 | 8/2001 | Adler et al. | |
| 6,282,300 | B1 | 8/2001 | Bloom et al. | |
| 6,316,712 | B1 | 11/2001 | Laroche | |
| 6,330,672 | B1 | 12/2001 | Shur | |
| 6,332,031 | B1 | 12/2001 | Rhoads et al. | |
| 6,332,194 | B1 | 12/2001 | Bloom et al. | |
| 6,334,187 | B1 | 12/2001 | Kadono | |
| 6,370,504 | B1 | 4/2002 | Zick et al. | |
| 6,408,082 | B1 | 6/2002 | Rhoads et al. | |
| 6,415,251 | B1 | 7/2002 | Oikawa et al. | |
| 6,449,378 | B1 | 9/2002 | Yoshida et al. | |
| 6,487,574 | B1 | 11/2002 | Malvar | |
| 6,504,941 | B2 | 1/2003 | Wong | |
| 6,523,113 | B1 | 2/2003 | Wehrenberg | |
| 6,553,127 | B1 | 4/2003 | Kurowski | |
| 6,585,341 | B1 | 7/2003 | Walker et al. | |
| 6,591,365 | B1 | 7/2003 | Cookson | |
| 6,608,867 | B2 | 8/2003 | Zhong et al. | |
| 6,614,914 | B1 | 9/2003 | Rhoads et al. | |
| 6,661,833 | B1 | 12/2003 | Black et al. | |
| 6,700,989 | B1 | 3/2004 | Itoh et al. | |
| 6,738,744 | B2 | 5/2004 | Kirovski et al. | |
| 6,751,564 | B2 * | 6/2004 | Dunthorn | 702/66 |
| 6,760,674 | B2 * | 7/2004 | Bombard | 702/76 |
| 6,778,678 | B1 | 8/2004 | Podilchuk et al. | |
| 6,787,689 | B1 | 9/2004 | Chen | |
| 6,807,634 | B1 | 10/2004 | Braudaway et al. | |
| 6,842,871 | B2 | 1/2005 | Piret et al. | |
| 6,891,958 | B2 | 5/2005 | Kirovski et al. | |
| 6,952,774 | B1 | 10/2005 | Kirovski et al. | |
| 6,961,444 | B2 | 11/2005 | Levy | |
| 6,978,048 | B1 | 12/2005 | Higginbottom et al. | |
| 6,983,057 | B1 | 1/2006 | Ho et al. | |
| 7,020,285 | B1 | 3/2006 | Kirovski et al. | |
| 7,031,491 | B1 | 4/2006 | Donescu et al. | |
| 7,047,413 | B2 | 5/2006 | Yacobi et al. | |
| 7,058,812 | B2 | 6/2006 | Yacobi et al. | |
| 7,062,653 | B2 | 6/2006 | Yacobi et al. | |
| 7,096,364 | B2 | 8/2006 | Yacobi et al. | |
| 7,123,744 | B2 | 10/2006 | Muratani et al. | |
| 7,142,691 | B2 | 11/2006 | Levy | |
| 7,183,479 | B2 | 2/2007 | Lu et al. | |
| 7,197,164 | B2 | 3/2007 | Levy | |
| 7,197,368 | B2 | 3/2007 | Kirovski et al. | |
| 7,206,649 | B2 | 4/2007 | Kirovski et al. | |
| 7,266,697 | B2 | 9/2007 | Kirovski et al. | |
| 7,301,092 | B1 | 11/2007 | McNally et al. | |
| 7,396,990 | B2 | 7/2008 | Lu et al. | |
| 7,518,053 | B1 * | 4/2009 | Jochelson et al. | 84/609 |
| 7,543,148 | B1 | 6/2009 | Kirovski et al. | |
| 7,552,336 | B2 | 6/2009 | Kirovski et al. | |
| 7,659,471 | B2 * | 2/2010 | Eronen | 84/600 |
| 7,756,874 | B2 * | 7/2010 | Hoekman et al. | 707/737 |
| 7,767,897 | B2 * | 8/2010 | Jochelson et al. | 84/609 |
| 7,803,050 | B2 * | 9/2010 | Mao et al. | 463/36 |
| 7,842,874 | B2 * | 11/2010 | Jehan | 84/609 |
| 8,548,373 | B2 | 10/2013 | Peiffer et al. | |
| 2001/0000701 | A1 | 5/2001 | Carneheim et al. | |
| 2002/0009208 | A1 | 1/2002 | Alattar et al. | |
| 2002/0090109 | A1 | 7/2002 | Wendt | |
| 2006/0254411 | A1 * | 11/2006 | Alcalde et al. | 84/608 |
| 2006/0274911 | A1 * | 12/2006 | Mao et al. | 381/334 |
| 2008/0040123 | A1 * | 2/2008 | Shishido | 704/503 |
| 2008/0072741 | A1 * | 3/2008 | Ellis | 84/609 |
| 2008/0168022 | A1 | 7/2008 | Benyamin | |
| 2008/0236371 | A1 * | 10/2008 | Eronen | 84/622 |
| 2008/0300702 | A1 * | 12/2008 | Gomez et al. | 700/94 |
| 2009/0178542 | A1 * | 7/2009 | Jochelson et al. | 84/609 |
| 2010/0251877 | A1 * | 10/2010 | Jochelson et al. | 84/609 |
| 2010/0290538 | A1 * | 11/2010 | Xu et al. | 375/240.28 |
| 2011/0014981 | A1 * | 1/2011 | Mao et al. | 463/36 |

FOREIGN PATENT DOCUMENTS

| | | |
|---|---|---|
| EP | 0840513 | 5/1998 |
| EP | 0899948 | 3/1999 |
| EP | 0913952 | 5/1999 |
| EP | 1017049 | 7/2000 |
| JP | 11110913 | 4/1999 |
| WO | WO98/03014 | 1/1998 |
| WO | WO99/11020 | 3/1999 |

OTHER PUBLICATIONS

Riley, et al., "A Text Retrieval Approach to Content-Based Audio Retrieval," Proceedings of the Ninth International Conference on Music Information Retrieval, retrieved at <<http://www.matthewriley.com/ismir2008.pdf>>, Sep. 14-18, 2008, 6 pages.

Lu, et al., "Automatic Mood Detection and Tracking of Music Audio Signals," IEEE Transactions on Audio, Speech, and Language Processing, retrieved at <<http://ieeexplore.ieee.org/stamp/stamp.jsp?arnumber=01561259>>, vol. 14, No. 1, Jan. 2006, pp. 5-18.

Kirovski, et al., "Audio Watermark Robustness to Desynchronization via Beat Detection," Revised Papers from the 5th International Workshop on Information Hiding, retrieved at <<http://www.goldenmetallic.com/research/ih02.pdf>>, Oct. 7-9, 2002, 15 pages.

Castro, et al., "Musical Beat Recognition Using a MLP-HMM Hybrid Classifier," TENCON 2004, retrieved at <<http://ieeexplore.ieee.org/stamp/stamp.jsp?arnumber=01414367>>,vol. 1, Nov. 2004, pp. 104-107.

Kirovski, et al., "Beat-ID: Identifying Music via Beat Analysis," 2002 IEEE Workshop on Multimedia Signal Processing, 2002, retrieved at <<http://research.microsoft.com/en-us/um/people/darkok/papers/beatid2.pdf>>, 4 pages.

Dempster, et al., "Maximum Likelihood from Incomplete Data via the EM Algorithm," Journal of the Royal Statistical Society, vol. 39, No. 1., 1977), pp. 1-38.

Mintzer, F. et al.; "If One Watermark is good, are more better?"; Proceedings of the 1999 IEEE International Conference on Acoustics, Speech, and Signal Processing; 1999; Mar. 19, 1999; pp. 2067-2069.

Swanson et al.; "Robust Audio Watermarking Using Perceptual Masking"; Signal Processing 66; 1998; pp. 337-355.

Zhao et al.; "A Generic Digital Watermarking Model"; Comput. & Graphics; vol. 22 No. 4; 1998; pp. 397-403.

Cookson, Christopher J., "U.S. Appl. No. 60/116,641", filed Jan. 21, 1999, 6 pages.

Cox, et al., "Secure Spread Spectrum Watermarking for Multimedia", IEEE, 1997, IEEE Transactions on Image Processing, vol. 6, No. 12, Dec. 1997, pp. 1673-1687.

Fridrich, Jiri, "Image Watermarking for Tamper Detection", Available at: citeseer.ist.psu.edu/fridrich98image.html, 1998, 5 pages.

(56) References Cited

OTHER PUBLICATIONS

Johnson, et al., "Transform Permuted Watermarking for Copyright Protection of Digital Video", IEEE, 1998, pp. 684-689.
Kankanhalli, et al., "Content Based Watermarking of Images", ACM Multimedia, 1998, pp. 61-70.
Kirovski, et al., "Robust Spread-Spectrum Audio Watermarking", IEEE, 2001, pp. 1345-1348.
Tang, et al., "A DCT-Based Coding of Images in Watermarking", IEEE, 1997, pp. 510-512.
Burges, et al, "Extracting Noise-Robust Features From Audio Data", ICASSP, 2002, 4 pages.
Haitsma, et al., "Robust Audio Hashing for Content Identification", Content Based Multimedia and Indexing, 2001, 8 pages.
Mihcak, et al. "A Perceptual Audio Hashing Algorithm: A Tool for Robust Audio Identification and Information Hiding", IHW '01, Proceedings of the 4th International Workshop on Information Hiding, 2001, 15 pages.
Malvar H.S.: Auditory Masking in Audio Compression. Audio Anecdotes, 2004.
Frey, et al., "Fast, Large-Scale Transformation-Invariant Clustering", NIPS 2001, 7 pages.

* cited by examiner

DETECTING BEAT INFORMATION USING A DIVERSE SET OF CORRELATIONS

BACKGROUND

Technology exists to analyze the beat-related characteristics of an audio item. However, the task of analyzing the characteristics of audio information may be a computationally intensive operation. Existing technology may not enable to perform this task in a suitably efficient manner. This potential deficiency, in turn, may restrict the uses to which this technology may be applied.

SUMMARY

A beat analysis module is described for determining beat information associated with an audio item. The beat analysis module uses a statistical modeling approach (such as an Expectation-Maximization approach) to determine an average beat period. In one illustrative implementation, the modeling approach performs correlation over diverse representations of the audio item. Next, the beat analysis module uses the average beat period to determine beat onset information associated with the commencement of the beats in the audio item. The beat onset information identifies the average onset of beats in the audio item and the actual onset for each individual beat.

Various applications can make use of the analysis performed by the beat analysis module. According to one illustrative aspect, the beat analysis module is configured to determine the beat information in a relatively short period of time. As such, the beat analysis module can perform its analysis together with another application task without disrupting the real time performance of that application task.

For example, in one illustrative application, the beat analysis module can be used to analyze beat information in the context of operations performed by a game module. In this approach, a user may select one or more audio items to be used in the course of a game. The beat analysis module can analyze the beat information and apply the beat information in the course of the game without disrupting the real time performance of the game.

According to one illustrative aspect, an application (such as a game module application) allows the user to select his or her own audio items to be used with the application. In other words, the providers of the application do not dictate a collection of audio items to be used with the application.

The above approach can be manifested in various types of systems, components, methods, computer readable media, data structures, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an approach for analyzing an audio item to determine beat information. The disclosure also sets forth various applications of the approach.

The disclosure is organized as follows. Section A describes an illustrative beat analysis module for determining beat information from an audio item. Section B describes various applications of the beat analysis module of Section A. Section C describes illustrative processing functionality that can be used to implement any aspect of the features described in Sections A and B.

Figure 13:
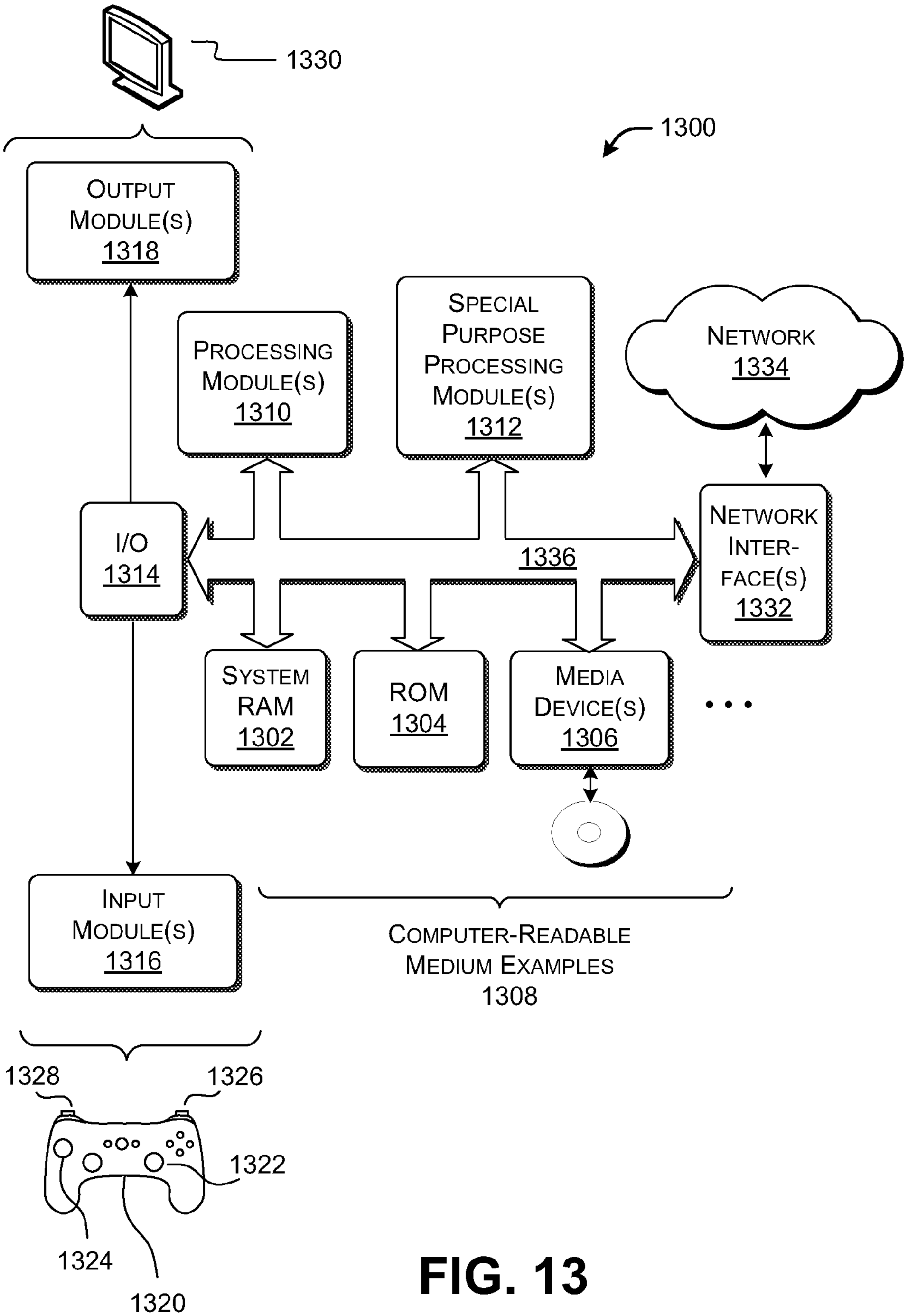
FIG. 13 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 13, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by software, hardware (e.g., discrete logic components, etc.), firmware, manual processing, etc., or any combination of these implementations.

As to terminology, the phrase "configured to" encompasses any way that any kind of functionality can be constructed to perform an identified operation. The functionality can be configured to perform an operation using, for instance, software, hardware (e.g., discrete logic components, etc.), firmware etc., and/or any combination thereof.

The term "logic" encompasses any functionality for performing a task. For instance, each operation illustrated in the flowcharts corresponds to logic for performing that operation. An operation can be performed using, for instance, software, hardware (e.g., discrete logic components, etc.), firmware, etc., and/or any combination thereof.

A. Illustrative System

A. 1. Overview of Illustrative Beat Analysis Module

Figure 1:
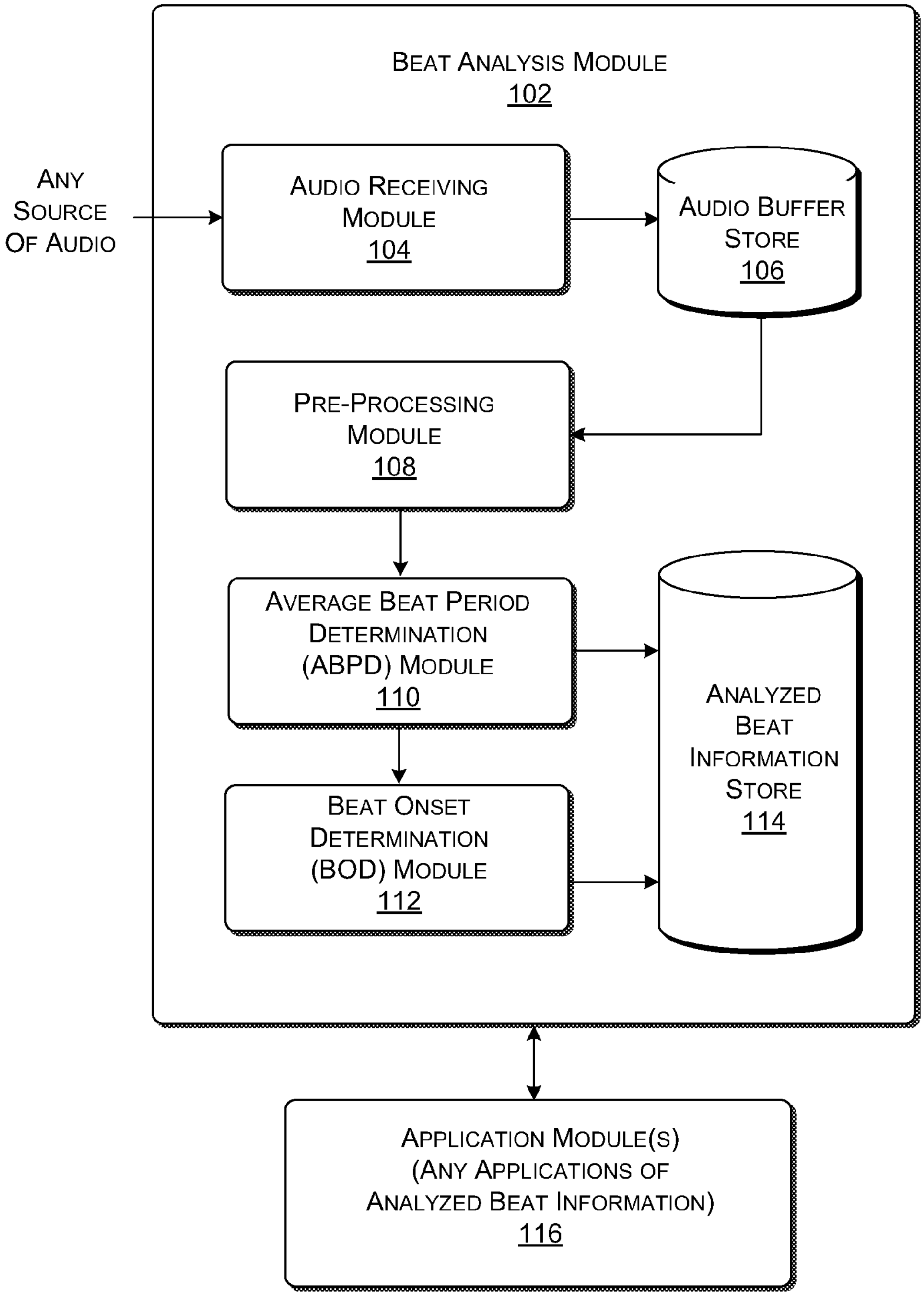
FIG. 1 shows an illustrative electronic beat analysis module for determining beat information from at an audio item.

FIG. 1 shows a beat analysis module 102 for determining beat information based on an audio item. Here, the term audio item corresponds to any audio information that includes a generally rhythmic content. In many cases, for instance, the audio item may include song information that includes a detectable beat.

The beat analysis module 102 includes an audio receiving module 104 for receiving the audio item (or multiple audio items) and storing the audio item in an audio buffer store 106. In one case, the beat analysis module 102 selects a relatively small portion of the audio item for analysis, such as, without limitation, a sample of 4-10 seconds in duration. However, the beat analysis module 102 can perform its analysis on audio items of any length. For example, the beat analysis module 102 can perform its analysis over the span of an entire audio item (e.g., an entire song). In the following explanation, the operations of the beat analysis module 102 will be described as being performed on an "audio item," where it is to be understood that the audio item may refer to a sample of the originally received audio item of any duration or the entire audio item.

The rhythmic content of the audio item may contribute to the appearance of regularly occurring patterns in its waveform. For instance, each instance of a regularly occurring pattern may include a distinct spike in audio level (or other telltale signal form). This spike may be attributed to a drum strike or other musical occurrence that marks out the tempo of a song. According to the terminology used herein, each instance of a regularly occurring pattern is referred to as a beat. As such, the audio item includes a sequence of beats. In formal musical notation, the beat of an audio item may have some relation a measure of a song, which, in turn, is governed by a time signature and tempo of the song. For example, a beat may correspond to a portion of a measure.

A pre-processing module 108 performs pre-processing on the audio item to place it in an appropriate form for further processing. In one case, for example, the audio item may include multiple channels. The pre-processing module 108 can convert the multiple channels into a single audio item by averaging the channels together to produce a single audio item. That is, in the case that there are n channels (j=1 to n), each sample $v_i$ of the resultant single-channel audio item is determined by:

$$v_i = \frac{1}{n}\sum_{j=1}^{n} v_i(j). \tag{1}$$

The pre-processing module 108 may also either downsample or upsample the audio item to a desired sample rate. For example, in one particular but non-limiting case, the pre-processing module 108 may downsample or upsample the audio item to 16 kHz.

An average beat period determination module (ABPD) 110 analyzes the beat determination module using a statistical modeling approach, such as an Expectation-Maximization (EM) approach. The ABPD module 110 determines the average beat period of beats within the audio item.

A beat onset determination (BOD) module 112 uses the average beat period to first determine the average beat onset for the audio item. That is, the onset of a beat determines when the beat is considered to commence. The average beat onset is formed by taking the average of individual beat onsets within the audio item. The BOD module 112 also determines the beat onset for each individual beat within the audio item. An individual beat onset is referred to herein as an actual beat onset for that particular beat.

The average beat period, the average beat onset, and actual beat onsets may be referred to herein as beat information. Also, any part of this information is referred to as beat information (for example, the average beat period can generically be referred to as beat information). The beat analysis module 102 can store the beat information in an analyzed beat information store 114.

An application module 116 may use the beat information to perform any type of application task (referred to in the singular below for brevity). For example, a game module may use the beat information in the course of the play of a game. For instance, the game module may use the beat information to synchronize action in the game to an audio item, to synchronize an audio item to action in the game, to select an appropriate audio item from a collection of audio items, and so on. No limitation is placed on the uses of the beat information. Section B will provide additional information regarding illustrative applications of the beat information.

Later figures will be used to explain in detail how the ABPD module 110 and the BOD module 112 may be configured to operate. At this point, suffice it to say that the beat analysis module 102 is configured to compute the beat information in a relatively short period of time, for example, in one case, in a fraction of a second. This enables the application module 116 to perform beat analysis in an integrated manner with other application tasks. In other words, because the beat analysis is performed so quickly, it does not unduly interfere with the performance of the application tasks. This makes it possible to perform the beat analysis in an integrated fashion with other application tasks, rather than, for example, in off-line fashion prior to the application tasks. In one concrete case, a game module can incorporate beat analysis in the course of a game playing operation without unduly affecting the real-time operation of the game.

Figure 2:
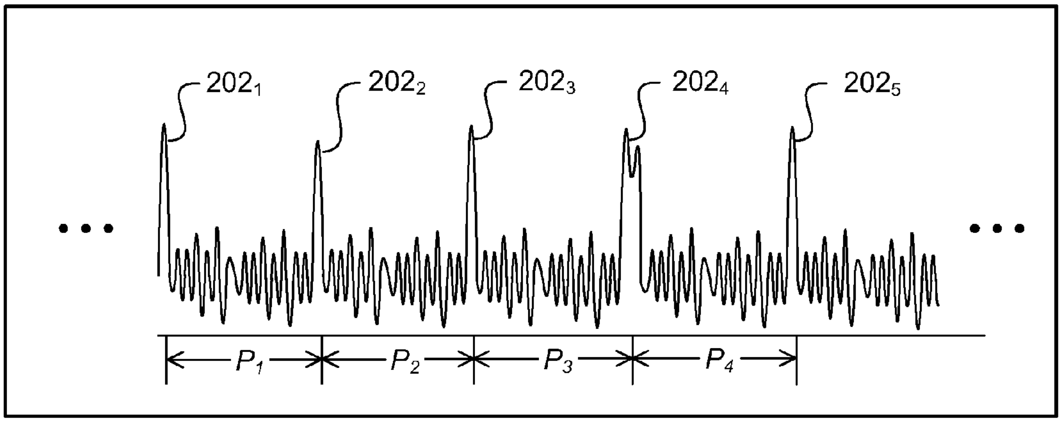
FIG. 2 graphically illustrates the concept of beats within an audio item.
Figure 3:
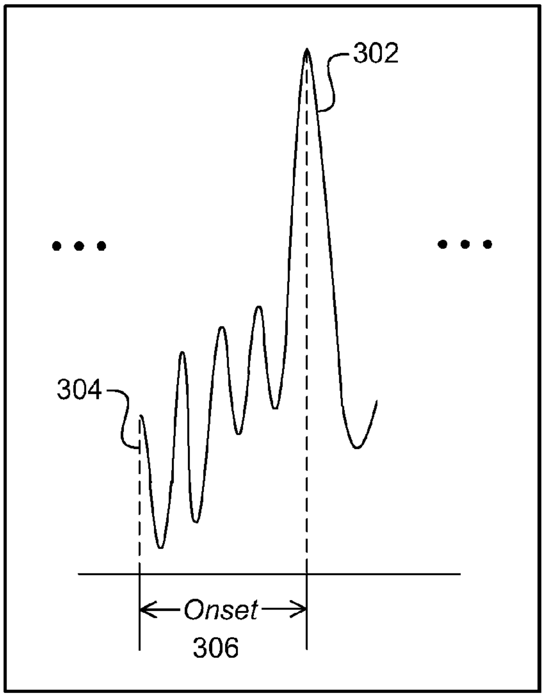
FIG. 3 graphically illustrates the concept of beat onset for a particular beat of the audio item.

FIGS. 2 and 3 show illustrative waveform excerpts of an audio item, which help clarify the concepts of average beat period, average beat onset, and actual beat onset. Starting with FIG. 2, this figure shows a segment of an audio item. The signal level of the audio item may be normalized to vary between, for example, 1 and −1, using any quantization approach. This particular representative audio item is characterized by regularly occurring patterns in the audio level. Furthermore, the patterns may include distinct spikes ($\mathbf{202}_1$, $\mathbf{202}_2$, . . . $\mathbf{202}_5$) or other telltale variations in audio level. As noted above, the spike in level may be associated with a drum strike or musical occurrence used to mark out a tempo in a song. A beat corresponds to each instance of the regularly occurring pattern. FIG. 2 identifies five beats within the audio item. The duration of a beat defines its period; that is, a first beat has period $P_1$, a second beat has period $P_2$, and so on. The average beat period defines the average duration of beats in the audio item.

FIG. 3 shows a smaller portion of an audio item. In this case, the audio item includes a distinct beat peak 302. Assume further that, as a result of the analysis performed by the ABPD module 110, the beat is tentatively defined to start at a time instance 304. The BOD module 112 measures an onset 306 from the time instance 304 to the time at which the beat peak 302 occurs. More specifically, the onset 306 defines the actual onset for this particular beat. The average of the onsets for several beats defines an average onset time. (As will be described below, the BOD module 112 actually operates by first determining the average onset; from that information, the BOD module 112 defines the actual onsets for individual beats).

A.2. General Mathematical Basis for Beat Analysis

As a preliminary matter, this section sets out general mathematical principles for use in determining beat information. The next section (Section A.3) describes one illustrative implementation of the mathematical approach in this section. There are many ways to implement the analysis in this section; the specific implementation in Section A.3 represents a particularly fast and accurate approach for performing beat analysis that does not follow from the general principles described in this section.

Let $u_m$ denote the signal energy at frame m of an audio item. To compute $u_m$, the waveform of the audio item can be analyzed in the time domain. The approach applies a window function at equally spaced time points, indexed by m=1, . . . , M. $u_m$ is the mean squared value of the windowed signal.

The approach can model the beat by assuming that $u_m$ is approximately periodic in m, with beat period τ. To estimate τ, the approach can use the following model:

$$u_m=\eta u_{m-\tau}+\rho_m \quad (2).$$

Here, $\rho_m$ is, for example, Gaussian noise with mean zero and variance $\sigma^2$. This defines a probabilistic model in which $u_m$ are the observed variances, τ is a hidden variable, and η and σ are parameters. The model can be expressed by:

$$p(\{u_m\}\mid\tau)=\prod_m \frac{1}{\sqrt{2\pi\sigma^2}}e^{-(u_m-\eta u_{m-\tau})^2/2\sigma^2}. \quad (3)$$

To complete the definition of the model, the prior distribution p(τ) can be defined as a flat distribution. That is, p(τ)=const.

The Expectation-Maximization (EM) algorithm can then be used to estimate the period τ and the model parameters. EM is an iterative algorithm, where the E-step updates the sufficient statistics and the M-step updates the parameter estimates. In the present context, the sufficient statistics corresponds to the full posterior distribution over the beat period, conditioned on the data. It is computed via Bayes' rule:

$$p(\tau\mid\{u_m\})=\frac{1}{z}p(\{u_m\}\mid\tau)p(\tau). \quad (4)$$

Here, z is a normalization constant. It can be shown to be equal to the data distribution, $z=p(\{u_m\})$, but since it is independent of τ it does not need to be actually computed. This posterior can be computed efficiently for any value of τ by observing that its logarithm is the autocorrelation of $u_m$:

$$\log p(\tau\mid\{u_m\})=\frac{1}{\sigma^2}\sum_m u_m u_{m-\tau}+const.. \quad (5)$$

The posterior can be computed using Fast Fourier Transform (FFT). The resulting complexity of the E-step is O (M log M).

The M-step update rules can be derived by minimizing the complete data log-likelihood E log $p(\{u_m\}|\tau)$ p(τ), where the operator E performs averaging over τ with respect to the posterior formulation provided above in equation (4). The following expressions are obtained:

$$\eta=\sum_m u_m E u_{m-\tau}\Big/\sum_m u_m^2,\text{ and} \quad (7)$$

$$\sigma^2=\frac{1}{M}\sum_m E(u_m-\eta u_{m-\tau})^2.$$

As in the E-step, the computations involved in equations (6) and (7) can be performed efficiently using FFT.

Finally, the beat period can be obtained by using a maximum a posteriori (MAP) estimate:

$$\hat{\tau}=\underset{\tau}{\arg\max}\ p(\tau\mid\{u_m\}). \quad (8)$$

Experimentally, the posterior over τ is relatively narrow. In the following, τ can be used to refer to $\hat{\tau}$.

To compute the average beat onset, the approach can divide $u_m$ into consecutive non-overlapping sequences of length τ. The sequence i can be denoted by $(u_1^i, u_2^i, \ldots u_\tau^i)$, where $u_n^i=u_{(i-1)\tau+n}$ and n=1, . . . τ. The approach can then perform averaging over those sequences. The average sequence can be denoted by $(\bar{u}_1, \ldots \bar{u}_\tau)$. The average onset $\bar{l}$ is defined by:

$$\bar{l}=\underset{1\le n\le\tau}{\arg\max}\ \bar{u}_n. \quad (9)$$

The actual beat onset for an individual beat can be computed for each τ-long sequence above. It can be assumed, in one case, that the onset time l for a given sequence may deviate from the average onset time $\bar{l}$ by as much as about 10% of the beat period. Hence, the approach can search for $l_i$, the beat onset time for sequence i, within the corresponding interval:

$$l_i=\arg\max_{\bar{l}-\tau/10\le n\le\bar{l}+\tau/10} u_n^i. \quad (10)$$

The onset times $l_i$ can be converted back to the time domain where they form part of the beat information.

A.3. Particular Illustrative Implementation of Beat Analysis

This section describes one particular implementation of the statistical modeling approach of Section A.2. One way in which the particular implementation of this section improves on the approach in Section A.2 is by performing correlation over a diverse set of representations of the audio item. In the following explanation, the beat period will be referred to as P.

More generally, the definition of symbols used in this section is to be found within this section, not the prior section.

Figure 4:
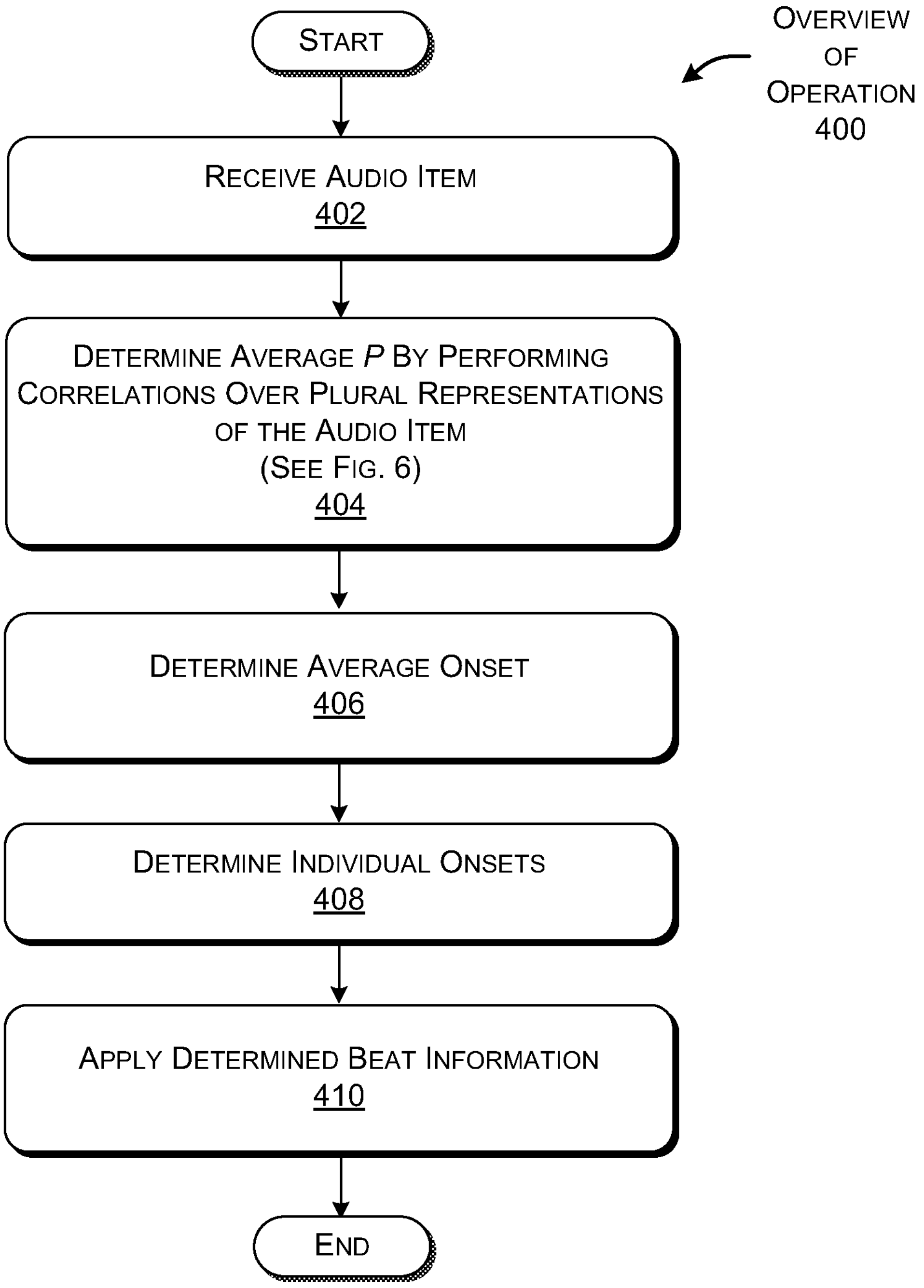
FIG. 4 is a flowchart which presents an overview of one illustrative approach to determining beat information; in this approach, an Expectation-Maximization (EM) approach is used to determine the average beat period, where correlation is performed over a diverse set of representations of the audio item.

FIG. 4 is a flowchart that shows an illustrative procedure 400 for determining beat information according to the approach in this section. FIGS. 5-10 provide additional information regarding the operations performed in the procedure 400.

Starting with FIG. 4, in block 402, the audio receiving module 104 of the beat analysis module 102 receives an audio item.

In block 404, the ABPD module 110 determines the average beat period P by performing correlations over plural representations of the audio item. Subsequent figures will explain how this operation is performed.

In block 406, the BOD module 112 determines the average onset for the beats in the audio item.

In block 408, the BOD module 112 determines the actual onsets for individual beats in the audio samples.

In block 410, the application module 116 applies the above-defined beat information for use in performing any application task.

Figure 5:
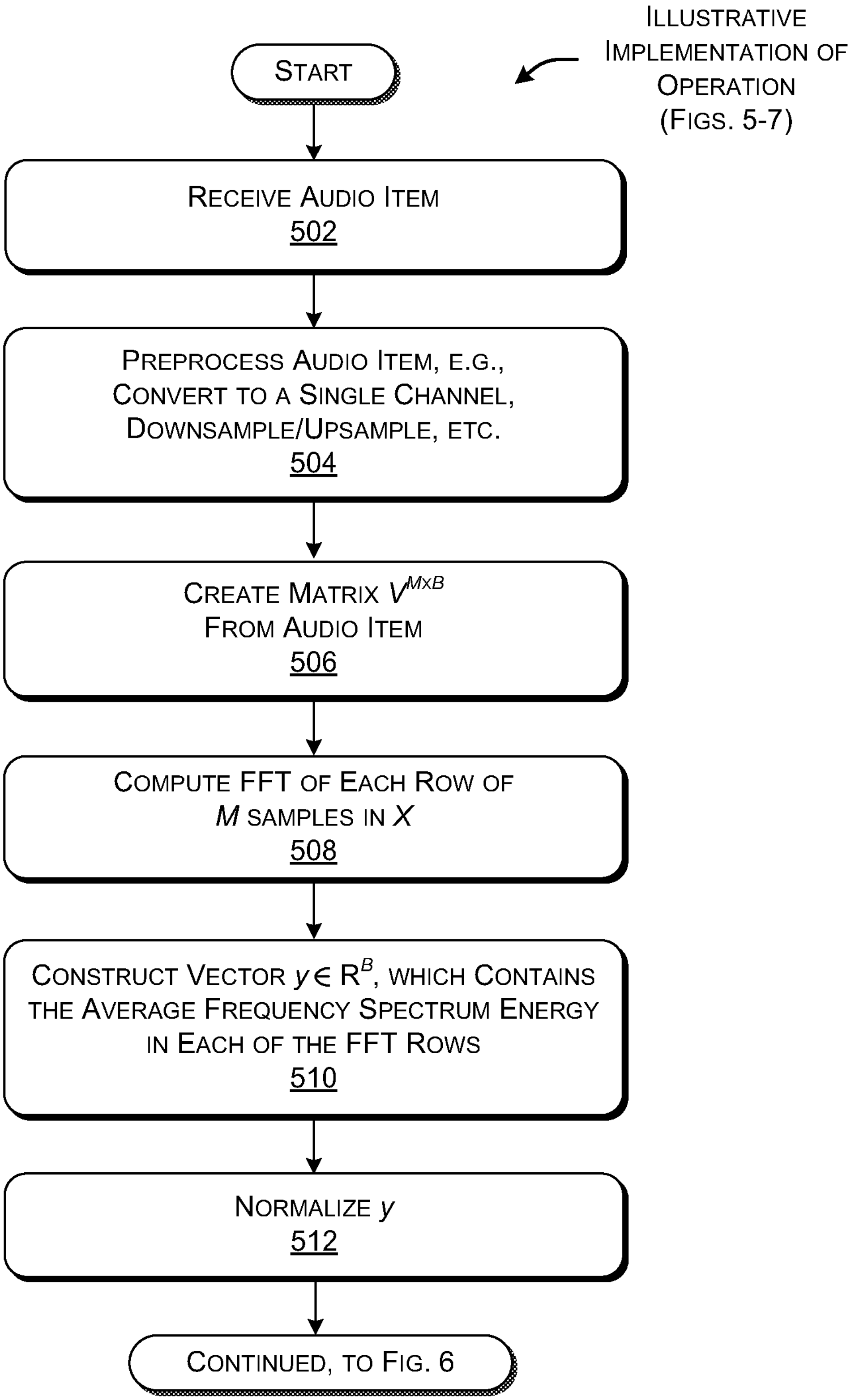
FIGS. 5-7 together present another flowchart that provides additional illustrative details regarding the approach outlined in FIG. 4.
Figure 6:
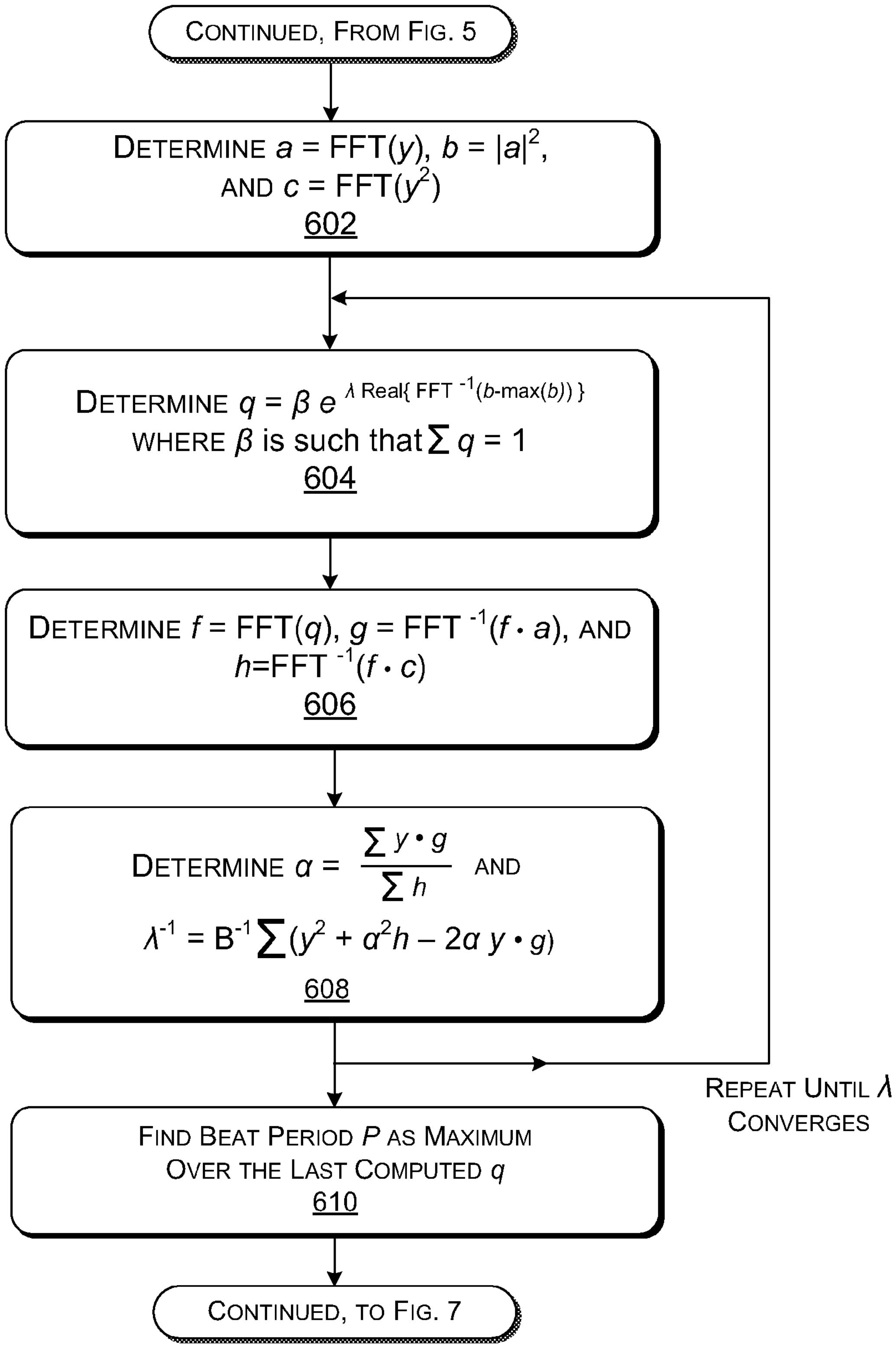
Figure 7:
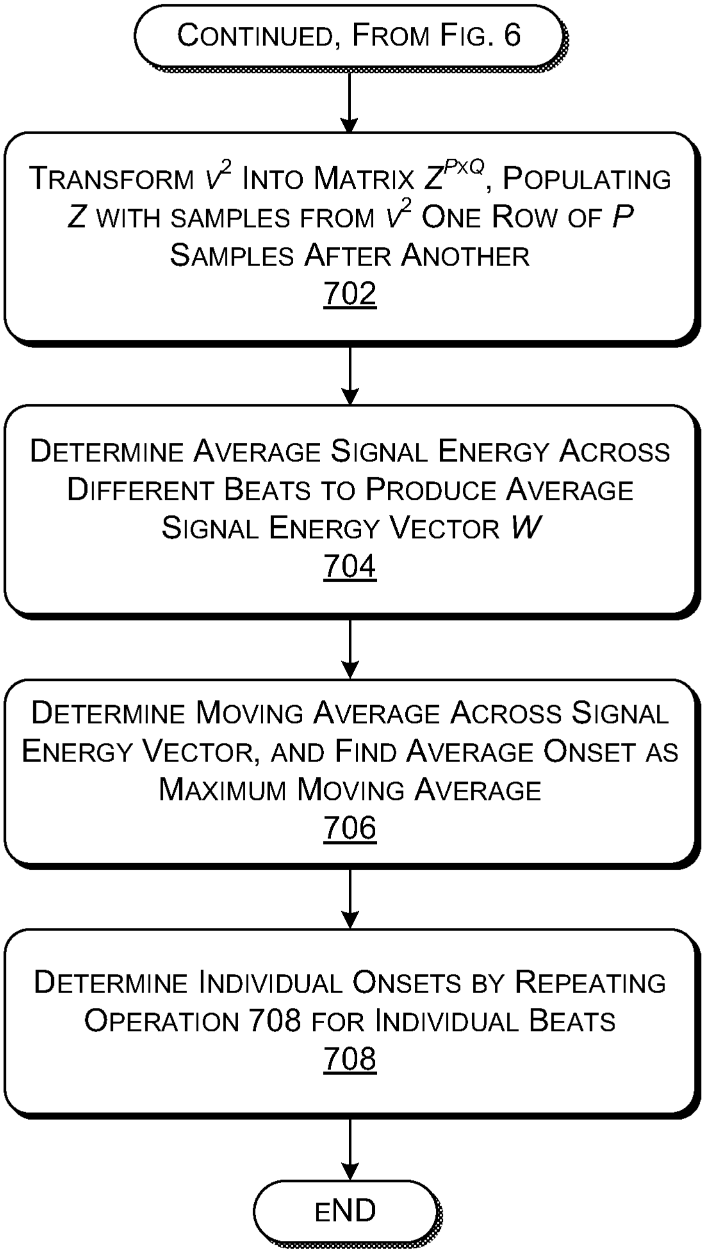

FIGS. 5-7 together define a procedure 500 that explains how the operations in FIG. 4 are performed. FIGS. 5-7 will be described below in conjunction with the illustrative mathematical analyses illustrated in FIGS. 8-10.

Starting with FIG. 5, in block 502, the audio receiving module 104 receives an audio item. In its originally-received form, the audio item may have multiple channels. Further, the audio item may be represented in a source sampling frequency.

In block 504, the pre-processing module 108 can perform pre-processing operations on the original audio item to convert it into a form that is suitable for further analysis. In one case, the pre-processing may entail extracting a portion of the audio item for analysis, such as, without limitation, a portion of the audio item of 4-10 second duration. Pre-processing may also entail converting the multiple channels of the audio item into a single channel (e.g., using the averaging technique of equation (1)). The pre-processing may also entail downsampling or upsampling the audio items to a desired sampling rate, such as, without limitation, 16 kHz. As a result of these operations, the audio item defines a linear sequence v of N samples, that is, $v \equiv \mathbb{R}^N$. Expression 802 of FIG. 8 expresses the audio item at this point as $v=v_1, v_1, \ldots v_N$, where $v_1, v_1, \ldots v_N$ define samples of the audio item.

Figure 8:
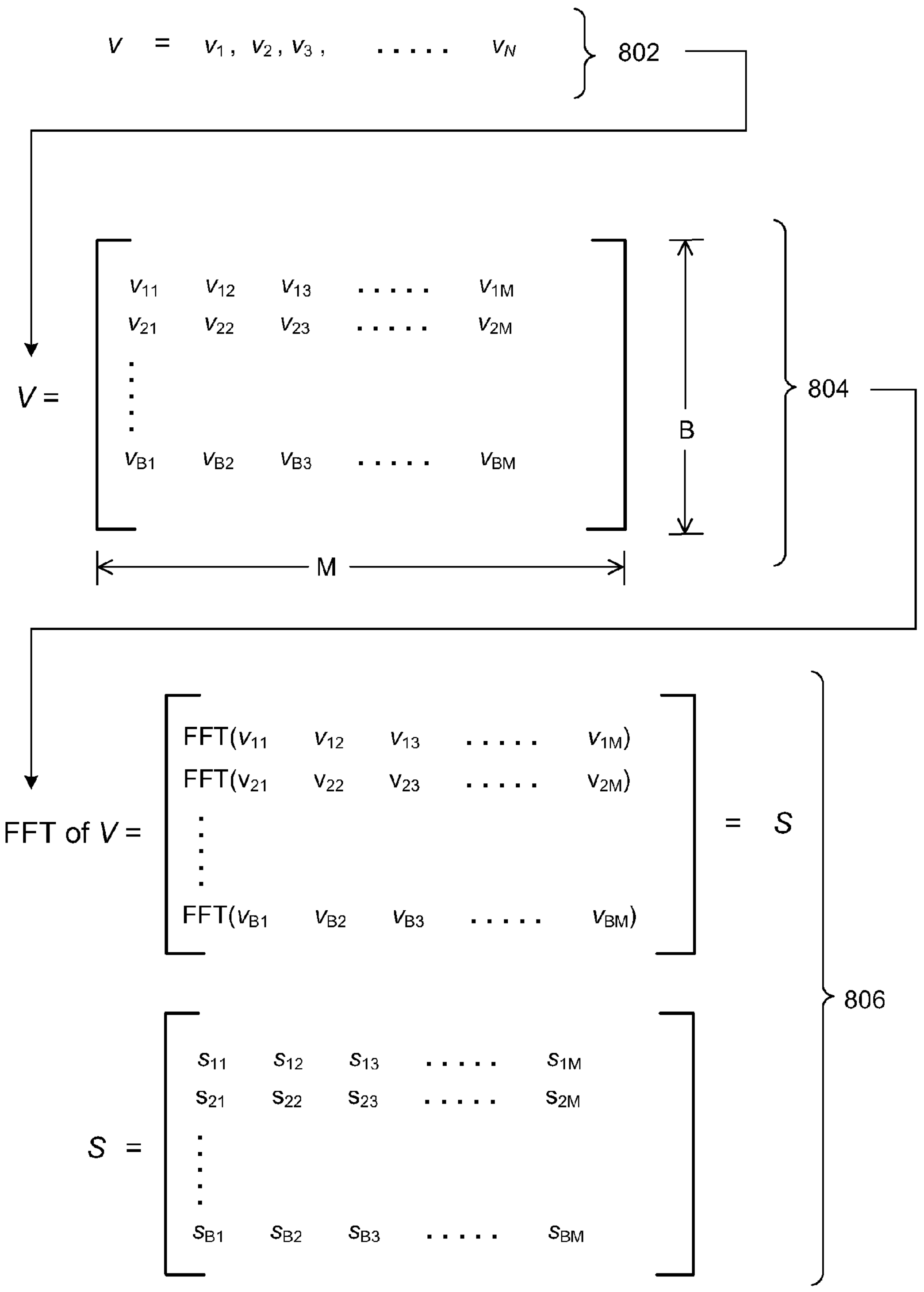
FIGS. 8-10 present additional illustrative details regarding mathematical operations that may be performed by the approach of FIGS. 4-7.

In block 506, the ABPD module 110 reshapes the linear sequence of samples in the audio item into a M×B array of samples V, that is $V=\mathbb{R}^{M \times B}$.. In other words, the ABPD module 110 populates the elements of the matrix V one row of M samples at a time. Matrix 804 of FIG. 8 illustrates the matrix V. The number of elements in the rows, M, is selected such that it is a power of 2, such as, without limitation 512. The reason for defining the length of a row in this manner is because Fast Fourier Transform (FFT) analysis (to be described below) can be more efficiently performed on data sets having a length which is a power of 2. The number of rows or blocks, B, is such that $$\left\lceil \frac{N}{M} \right\rceil.$$

If the number of elements in the linear sequence of samples v do not completely fill out the matrix V, then the ABPD module 110 can pad the trailing elements of the matrix V with zeros.

In one case, there is no overlap in samples in the matrix V. In this case, the element $v_{21}$ at the start of the second row is the next element following $v_{1M}$, which is the last element in the first row; in other words, if element $v_{1m}$ corresponds to element $v_j$ in the sequence of linear samples, then element $v_{21}$ corresponds to element $v_{j+1}$. In another implementation, there is an overlap of samples between rows of the matrix V. For example, assuming that M is 512, then the first element in the second row ($v_{21}$) could start at, for example, element $v_{440}$ in the sequence of linear samples, even though the last element in the first row ($v_{1M}$) corresponds to the element $v_M$ (i.e., $v_{512}$) in the linear sequence.

In block 508, the ABPD module 110 computes the FFT of each of the rows of the matrix V. As shown in expression 806 of FIG. 8, this operation can produce a matrix of complex elements, labeled as matrix S.

In block 510, the ABPD module 110 constructs a vector y that contains the average frequency spectrum energy in each of the rows of S. To produce this vector y, the ABPD module 110 can square each of the elements in the matrix S, that is, by performing the operation $\|S^2\|$. For instance, the ABPD module 110 can square the element $s_{11}$ by adding the square of its real component to the square of its imaginary component, to yield element $\bar{s}_{11}$ of the $\|S^2\|$ matrix. The ABPD module 110 then finds the average energy in each row by summing the elements in each row of the $\|S^2\|$ matrix and by dividing the sum by M. This operation is illustrated as expression 902 of FIG. 9. For example, the first element $y_1$ of the vector y is defined by $$\sum_{i=1}^{M} \frac{1}{M} \bar{s}_{1M}.$$

The vector y has B real elements.

Figure 9:
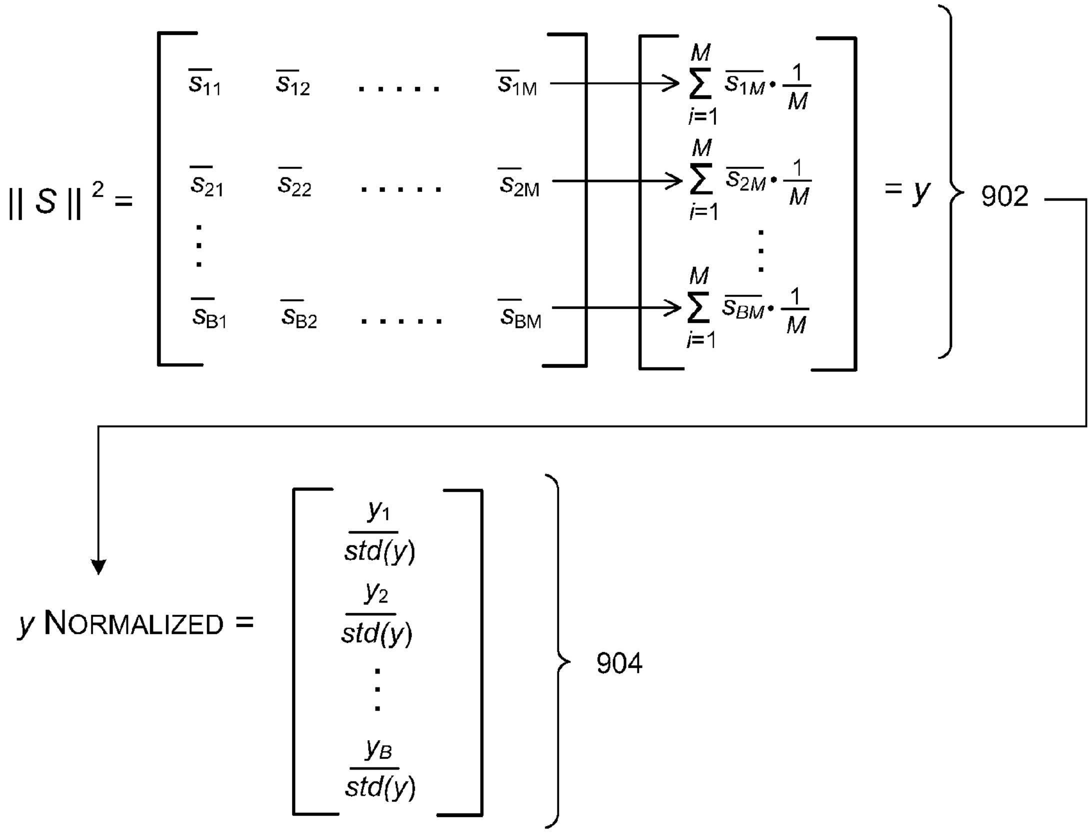

In block 512, the ABPD module 110 normalizes the vector y by dividing each element of the vector y by the standard deviation (std) of the vector y. Expression 904 in FIG. 9 illustrates this operation.

Advancing to FIG. 6, the ABPD module 110 commences an iterative EM algorithm on the basis of the vector y. Before doing so, the ABPD module 110 can pad the vector y with zeros such that it has a length that is a power of 2. In other words, the length $2^\epsilon$ of the vector y can be selected such that $2^{68} \geq B$, where $\epsilon$ in an integer. As stated before, performing this padding operation makes it more efficient to perform FFT on a set of data.

In block 604, the ABPD module 110 begins by calculating the vector a=FFT(y) (which is a complex vector), $b=|a|^2$ (which is a real vector), and $c=FFT(y^2)$ (which is a complex vector).

In block 604, the ABPD module 110 determines the vector q as follows:

$$q=\beta e^{\lambda Re[FFT^{-1}(b-max(b))]} \quad (11).$$

In expression (11), λ is a scaling factor and β is chosen such that Σq=1. Values of (b−max(b)) are real. To create a complex vector from this real vector, the ABPD module 110 can set the real component of the complex vector to (b−max(b)) and the imaginary component to zero.

In block 606, the ABPD module 110 next determines the vectors f=FFT(q) (which defines a complex vector), $g=FFT^{-1}(f \cdot a)$ (which defines a real vector), and $h=FFT^{-1}(f \cdot c)$ (which defines a real vector).

In block 608, the ABPD module 110 next determines:

$$\alpha = \frac{\sum y \cdot g}{\sum h}, \text{ and} \quad (12)$$

$$\lambda^{-1} = B^{-1} \sum (y^2 + \alpha^2 h - 2\alpha y \cdot g). \quad (13)$$

At this point, the loop in FIG. 6 indicates that the vector q can be recalculated with the new value of λ. This process can repeated until λ converges.

In block 610, the ABPD module 110 can now extract the average beat period from the vector q upon the completion of the last iteration. That is, the index (index) at which the maximum value in q occurs corresponds to average beat period. This index can be converted to an actual beat period t (where t is the index multiplied by some large constant, such as 200), by iteratively multiplying t by 2 or dividing t by 2 until the value of t satisfies the expression $0.7<f_s/t<2.3$, where $f_s$ is the sampling frequency.

At this point, the ABPD module 110 has performed its task of determining the average beat period P of the audio item (that is, P=t). As noted above, the iterative EM procedure is implemented over a diverse set of correlations, e.g., by performing the correlations using different representations of the audio item. In the context of FIG. 6, the use of different correlations manifests itself in the use of a, b, and c vectors, as well as the f, g, and h vectors. In this case, correlation is performed based on a domain associated with the FFT of the audio signal, a domain associated with the inverse FFT of the audio signal, a domain associated with the square of the audio signal, and so on. This aspect may allow the ABPD module 110 to determine the beat information in an accurate manner. That is, one or more of these domains may be more effective than others in revealing redundancy in the audio signal. Accordingly, accuracy may improve by performing correlation over diverse representations of the audio signal.

Figure 10:
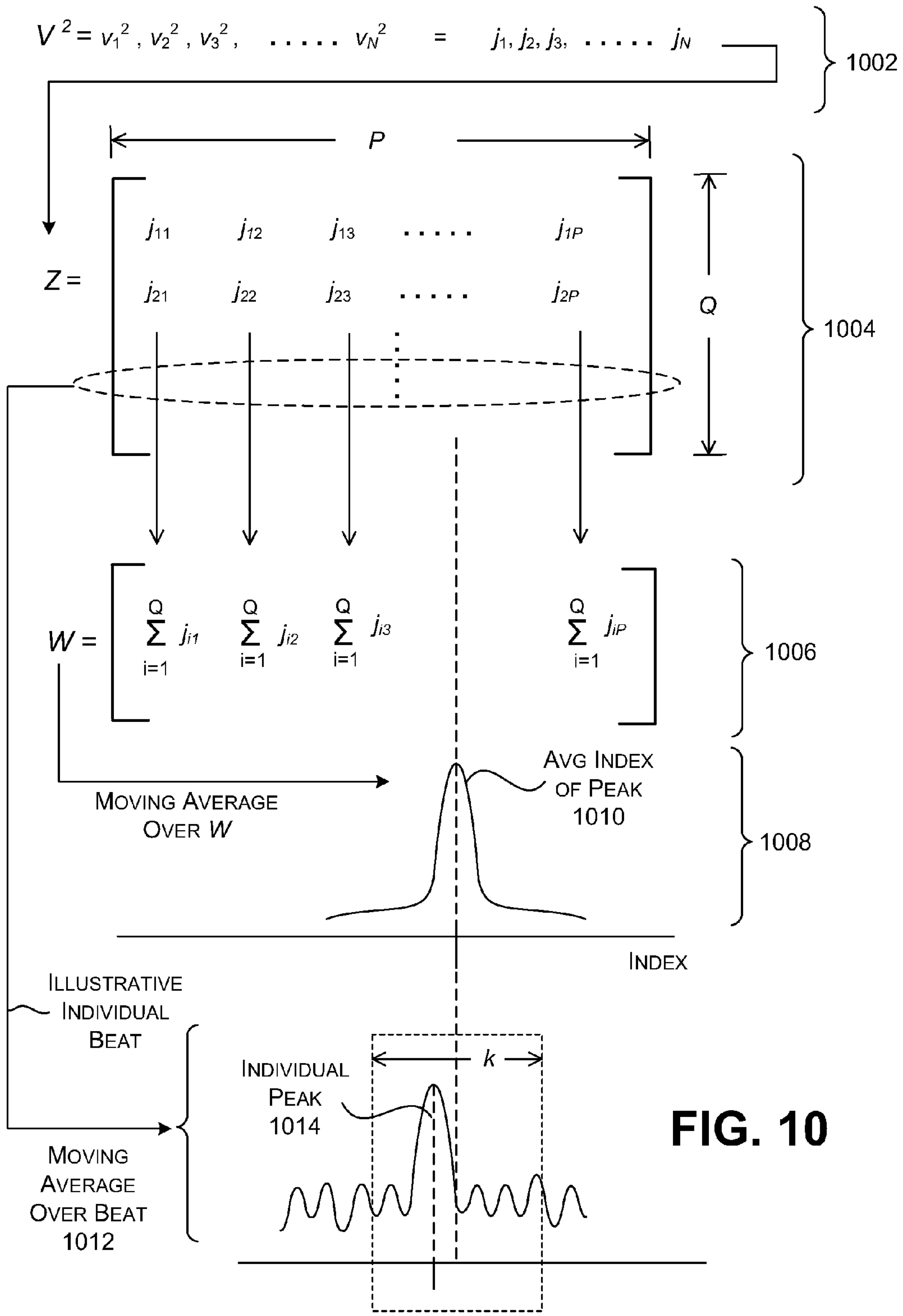

Advancing to FIG. 7, the beat onset determination (BOD) module 112 now is called on to compute the average beat onset for the audio item as a whole, as well as the actual beat onsets for individual beats in the audio item. The process starts in block 702 by squaring the original linear sequence of samples in the audio item v to produce a sequence of squared values $v_1^2, v_2^2 \ldots v_n^2$. As shown in expression 1002 in FIG. 10, the sequence of squared values can be labeled as elements $j_1, j_2, \ldots j_N$. The BOD module 112 forms a P×Q matrix Z from the sequence of elements $j_1, j_2 \ldots j_N$, populating this matrix Z one row of P samples at a time (where P corresponds to the average beat period determined by the ABPD 110). FIG. 10 shows this matrix Z as expression 1004.

In block 704, the BOD module 112 forms a vector W by taking the average single energy across different beats. As shown in expression 1006 of FIG. 10, this operation is equivalent to taking the average of each column in the matrix Z. For example, the first element $w_1$ of the matrix W is defined as $$\sum_{i=1}^{Q} j_{i1}.$$

In block 706, the BOD module 112 next forms a circular moving average over the vector W. As indicated by waveform 1008 of FIG. 10, one value along the moving average will represent a maximum value, illustrated in FIG. 10 as maximum value 1010. The index at which the maximum value 1010 occurs corresponds to the average beat onset for the audio item.

Finally, in block 708, the BOD module 112 determines the beat onset for each of the individual beats in the audio sample. To perform this task, the BOD module 112 can take the circular moving average of an individual beat in the audio sample, as represented by operation 1012 of FIG. 10. Then, the BOD module 112 defines a window of k samples centered around the average beat onset that was determined in block 706. Starting from the average beat onset, the BOD module 112 attempts to find the maximum 1014 in the individual beat. This process is repeated for each individual beat to define a collection of actual beat onsets.

The information calculated in procedure 500 (the average beat period, the average beat onset, and the actual beat onsets) defines beat information.

B. Illustrative Applications

Figure 11:
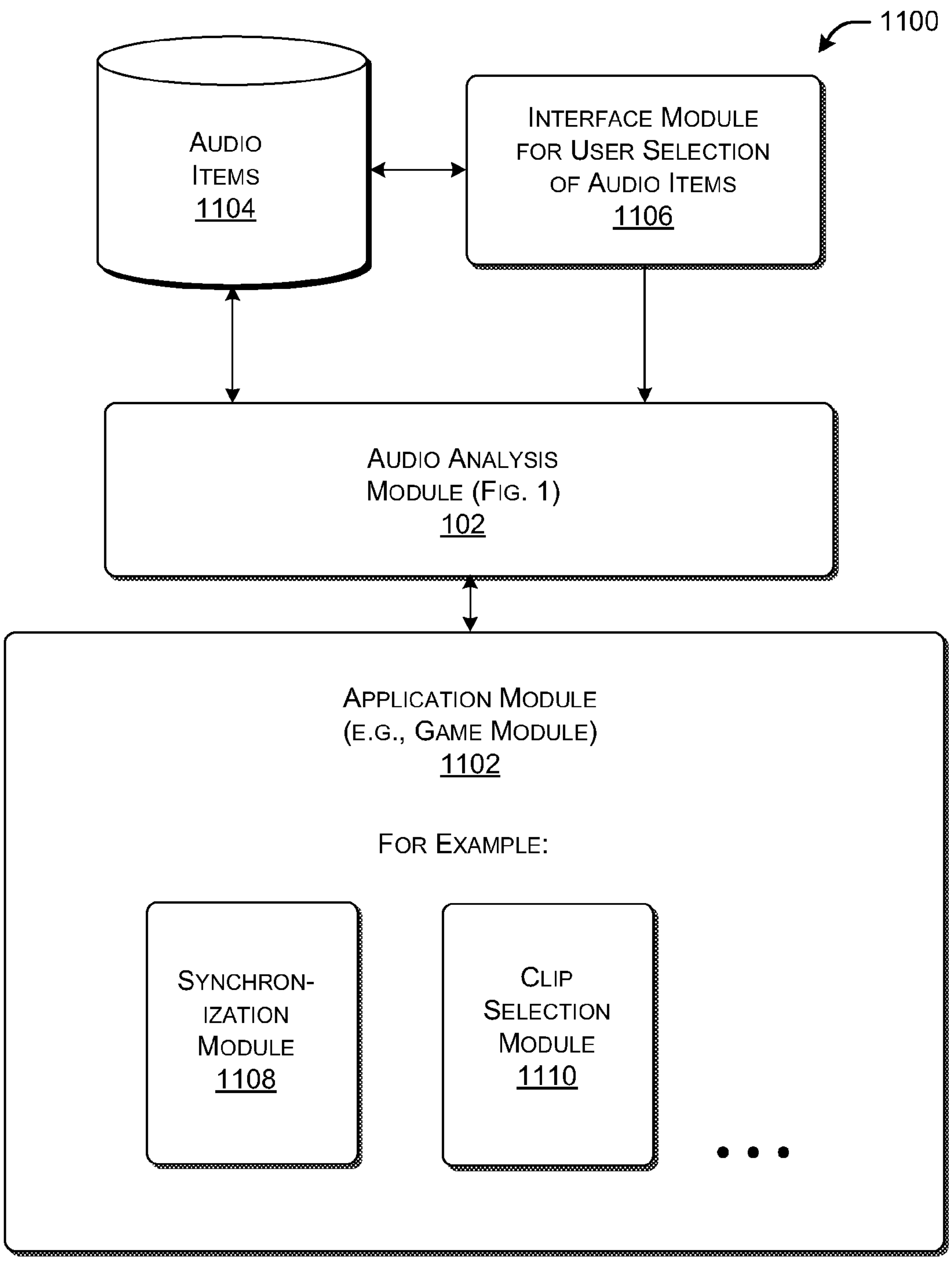
FIG. 11 shows a system which incorporates the beat analysis module of FIG. 1.

As described above, different types of applications can make use of the beat analysis module 102 of FIG. 1. FIG. 11 shows one such illustrative system 1100 that incorporates the beat analysis module 102. Namely, this system 1100 includes any kind of application module 1102 that makes use of beat information provided by the beat analysis module 102. In one illustrative and non-limiting case, the application module 1102 corresponds to a game module, such as a game console or a computer game that is implemented on a general-purpose computer (such as a personal computer), etc.

In this system 1100, the user may have access to a collection of audio items 1104. In one case, the user may own these audio items 1104. For example, the user may have acquired various free audio items from any source of such items. In addition, or alternatively, the user may have purchased various audio items 1104 from any source of such items. In addition, or alternatively, the user may have created various audio items 1104 (for example, the user may have recorded his or her own songs). In any event, a provider of the application module 1102 does not necessarily dictate the audio items that the user is expected to use in the application module 1102. Rather, the provider enables the user to select his or her own audio items from any source of audio items. This aspect of the system 1100 has various advantages. The user may consider this feature to be desirable because it empowers the user to select his or her own audio items.

An interface module 1106 defines any functionality by which the user can select one or more of the audio items 1104 for use by the application module 1102. In one case, the application module 1102 may provide a user interface that enables the user to select audio items for use with the application module 1102.

The beat analysis module 102 can compute the beat information relatively quickly. In one case, for example, the beat analysis module 102 can compute the beat information in a fraction of a second. In view of this feature, the operations performed by the beat analysis module 102 can be integrated together the other application tasks performed by the application module 1102 without unduly interfering with these application tasks. In one concrete case, a game module can perform beat analysis at various junctures in the game without slowing down the game or otherwise interfering with the game. As such, the game module does not need to perform the beat analysis in off-line fashion, although part of the analysis (or all the analysis) can also be performed in off-line fashion.

The application module 1102 itself can use the beat information in many different ways. In one example, the application module 1102 may include a synchronization module 1108. In one case, the synchronization module 1108 can use the beat information associated with an audio item to synchronize any kind of action (such as any kind of action happening in a game, or, more generally, behavior exhibited by a game) with the tempo of the audio item. In another example, the synchronization module 1108 can synchronize the audio item to any kind of action (such as any kind of action happening in a game, physical action performed by a human user, etc.). The synchronization module 1108 can synchronize the audio item to action by changing the tempo of the audio item (e.g., by slowing down or speeding up the audio item to match the action). In another example, the synchronization module 1108 can use the beat information to synchronize one audio item with respect to another audio item. The synchronization module 1108 can perform this operation, for example, by changing the tempo of one of the audio items to match the other, or by changing the tempos of both audio items until they are the same or similar. This type of synchronizing operation may be appropriate where it is desirable to create a smooth transition from one song to the next. Still other types of synchronization operations can be performed.

A clip selection module 1110 can use the beat information to select an appropriate audio item or to select multiple appropriate audio items. For example, the user may have identified a collection of audio samples that he or she would like to use with the application module 1102. The clip selection module 1110 can select the audio item at a particular juncture that is most appropriate in view of events occurring at that particular juncture. For example, a game module can select an audio item that matches the tempo of action happening at a particular juncture of the game. An exercise-related module can select an audio item that matches the pace of physical actions performed by the user, and so on. To perform this task, the application module 1102 can analyze the beat information of one or more audio items in real time when an audio item is needed. It is also possible for the application module 1102 to perform this operation off-line, e.g., before the audio item is needed. In similar fashion, the clip selection module 1110 can select an audio item which most appropriately matches the tempo of another audio item.

The application module 1102 can make yet other uses of the beat information. For example, although not shown, the application module 1102 can use the beat information to form an identification label for an audio item. The application module 1102 can then use the identification label to determine whether an unknown audio item matches a previously-encountered audio item (e.g., by comparing the computed identification label for the unknown audio item with a list of known identification labels).

Figure 12:
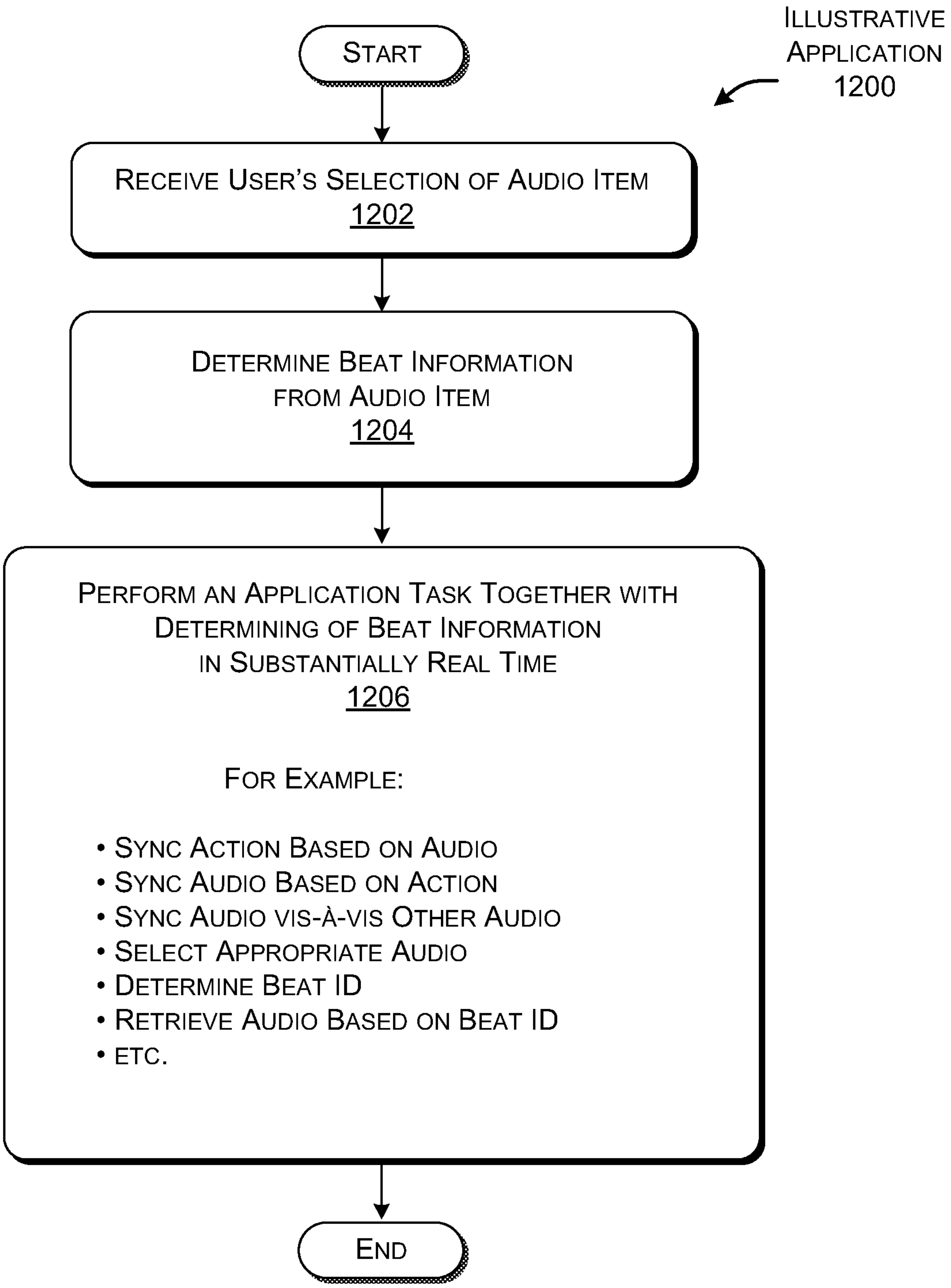
FIG. 12 is a flowchart that shows one illustrative manner of operation of the system of the FIG. 11.

FIG. 12 summarizes the explanation given above for FIG. 11 in flowchart form. In block 1202, the system 1100 receives the user's selection of one or more audio items (rather than being restricted by the provider of an application module 1102 to use a preselected audio item).

In block 1204, the beat analysis module 102 is used to determine beat information for one or more audio items. As explained above, the application module 1102 can invoke the beat analysis module 102 in off-line fashion (e.g., before performing other application tasks) or on-line fashion (e.g., in the course of performing other application tasks).

In block 1206, the application module 1102 performs any type of application based on the beat information. Without limitation, these applications can include: synchronizing events to beats in the audio item; synchronizing the audio item to events (e.g., by changing the tempo of the audio item); synchronizing an audio item with another audio item; selecting an appropriate audio item; determining a beat identification label; using a beat identification label to retrieve an audio item or perform some other task, and so on.

C. Representative Processing Functionality

FIG. 13 sets forth illustrative electrical data processing functionality or equipment 1300 (simply "processing functionality" below) that can be used to implement any aspect of the functions described above. With reference to FIG. 1, for instance, the type of equipment shown in FIG. 13 can be used to implement any aspect of the beat analysis module 102. In one case, the processing functionality 1300 may correspond to a general purpose computing device or the like. In another scenario, the processing functionality 1300 may correspond to a game console. Still other types of devices can be used to implement the processing functionality 1300 shown in FIG. 13.

In the context of FIG. 13, the processing functionality 1300 represents local client-side functionality that analyzes an audio item. But remote processing functionality (e.g., implemented by server-type computing functionality) can also be used to analyze the audio item. Such remote processing functionality can include the same processing components shown in FIG. 13 or a subset thereof.

The processing functionality 1300 can include volatile and non-volatile memory, such as RAM 1302 and ROM 1304. The processing functionality 1300 also optionally includes various media devices 1306, such as a hard disk module, an optical disk module, and so forth. More generally, instructions and other information can be stored on any computer-readable medium 1308, including, but not limited to, static memory storage devices, magnetic storage devices, optical storage devices, and so on. The term "computer-readable medium" also encompasses plural storage devices. The term "computer-readable medium" also encompasses signals transmitted from a first location to a second location, e.g., via wire, cable, wireless transmission, etc.

The processing functionality 1300 also includes one or more processing modules 1310 (such as one or more computer processing units, or CPUs). The processing functionality 1300 also may include one or more special purpose processing modules 1312 (such as one or more graphic processing units, or GPUs). A graphics processing module performs graphics-related tasks. One or more components of the special purpose processing modules 1312 can also be used to efficiently perform operations (such as FFT operations) used to analyze beat information.

The processing functionality 1300 also includes an input/output module 1314 for receiving various inputs from a user (via input module(s) 1316), and for providing various outputs to the user (via output module(s) 1318). One particular type of input module is a game controller 1320. The game controller 1320 can be implementing as any mechanism for controlling a game. The game controller 1320 may include various direction-selection mechanisms (e.g., 1322, 1324) (such as joy stick-type mechanisms), various trigger mechanisms (1326, 1328) for firing weapons, and so on. One particular output module is a presentation module 1330, such as a television screen, computer monitor, etc.

The processing functionality 1300 can also include one or more network interfaces 1332 for exchanging data with other devices via a network 1334. The network 1334 may represent any type of mechanism for allowing the processing functionality 1300 to interact with any kind of network-accessible entity. One or more communication buses 1336 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer readable storage device for storing computer readable instructions, the computer readable instructions providing a beat analysis module when executed by one or more processing devices, the computer readable instructions comprising:

logic configured to preprocess an audio item;

logic configured to form a matrix based on samples of the audio item;

logic configured to determine a Fast Fourier Transform (FFT) of rows of the matrix;

logic configured to construct a vector y which contains an average frequency spectrum energy of each of the rows of the matrix; and logic configured to perform an Expectation-Maximization (EM) iterative procedure on the basis of the vector y to determine an average beat period P of the audio item, the EM iterative procedure being performed over plural representations of the audio item.

2. The computer readable storage device of claim 1, further comprising:

logic configured to construct another matrix based on the samples in the audio item, each row of the another matrix having a length that is based on the average beat period P;

logic configured to use the another matrix to determine an average signal energy vector W, the average signal energy vector W expressing an average signal energy across different beats in the audio item; and logic configured to use the average energy vector W to determine an average onset of beat maximums within the audio item.

3. The computer readable storage device of claim 2, further comprising:

logic configured to use the average onset to determine an actual onset for at least one beat within the audio item.

4. The computer readable storage device of claim 1, wherein one representation of the audio item corresponds to an FFT of audio information associated with the audio item.

5. The computer readable storage device of claim 1, wherein one representation of the audio item corresponds to an inverse FFT of audio information associated with the audio item.

6. The computer readable storage device of claim 1, wherein one representation of the audio item corresponds to a higher-order power of audio information associated with the audio item.

7. The computer readable storage device of claim 6, the higher-order power being a square of the audio information.

8. The computer readable storage device of claim 1, wherein the logic configured to preprocess the audio item is further configured to convert the audio item from a plurality of channels into a single channel.

9. The computer readable storage device of claim 8, the converted audio item comprising an average over the plurality of channels.

10. The computer readable storage device of claim 1, wherein the matrix comprises at least some overlapping samples.

11. The computer readable storage device of claim 1, wherein the matrix does not comprise overlapping samples.

12. The computer readable storage device of claim 1, wherein the logic configured to perform the Expectation-Maximization (EM) iterative procedure is further configured to compute:

an FFT of the vector y which contains the average frequency spectrum energy to output a complex vector a.

13. The computer readable storage device of claim 12, wherein the logic configured to perform the Expectation-Maximization (EM) iterative procedure is further configured to compute:

a real vector b comprising a square of the complex vector a.

14. The computer readable storage device of claim 13, wherein the logic configured to perform the Expectation-Maximization (EM) iterative procedure is further configured to compute:

a vector $y^2$ comprising a square of the vector y which contains the average frequency spectrum energy; and an FFT of the vector $y^2$ to output a complex vector c.

15. The computer readable storage device according to claim 14, the plural representations of the audio item comprising a, b, and c.

16. The computer readable storage device according to claim 1, the logic configured to determine the FFT of the rows of the matrix comprising logic configured to provide the matrix to a special purpose processing module that performs the FFT of the rows of the matrix.

17. A method comprising:

preprocessing an audio item;

forming a matrix based on samples of the audio item;

determining a Fast Fourier Transform (FFT) of rows of the matrix;

constructing a vector y which contains an average frequency spectrum energy of each of the rows of the matrix; and performing an Expectation-Maximization (EM) iterative procedure on the basis of the vector y to determine an average beat period P of the audio item, the EM iterative procedure being performed over plural representations of the audio item.

18. A system comprising:

a beat analysis module configured to:

preprocess an audio item;

form a matrix based on samples of the audio item;

determine a Fast Fourier Transform (FFT) of rows of the matrix;

construct a vector y which contains an average frequency spectrum energy of each of the rows of the matrix; and perform an Expectation-Maximization (EM) iterative procedure on the basis of the vector y to determine an average beat period P of the audio item, the EM iterative procedure being performed over plural representations of the audio item; and one or more processing units configured to execute the beat analysis module.

* * * * *